(12) United States Patent
Jia

(10) Patent No.: US 10,705,622 B2
(45) Date of Patent: Jul. 7, 2020

(54) SCANNING IMAGING PART, SCANNING IMAGING DEVICE, AND ELECTRONIC APPARATUS

(71) Applicant: Guangdong OPPO Mobile Telecommunications Corp., Ltd., Dongguan, Guangdong (CN)

(72) Inventor: Yuhu Jia, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/429,753

(22) Filed: Jun. 3, 2019

(65) Prior Publication Data

US 2019/0369743 A1    Dec. 5, 2019

(30) Foreign Application Priority Data

Jun. 4, 2018    (CN) .......................... 2018 1 0564141

(51) Int. Cl.
*G06F 3/01*    (2006.01)
*G02B 26/00*    (2006.01)
(Continued)

(52) U.S. Cl.
CPC ........... *G06F 3/017* (2013.01); *G02B 26/004* (2013.01); *G02B 26/02* (2013.01); *H04N 5/2254* (2013.01)

(58) Field of Classification Search
CPC combination set(s) only.
See application file for complete search history.

(56) References Cited

U.S. PATENT DOCUMENTS

2007/0152134 A1    7/2007 Abe
2009/0322215 A1    12/2009 Sung et al.
(Continued)

FOREIGN PATENT DOCUMENTS

CN    203838722 U    9/2014
CN    205211942 U    5/2016
(Continued)

OTHER PUBLICATIONS

International search report issued in corresponding international application No. PCT/CN2019/089855, dated Aug. 20, 2019 (4 pages).

(Continued)

*Primary Examiner* — Van N Chow
(74) *Attorney, Agent, or Firm* — Young Basil Hanlon & MacFarlane, P.C.

(57) ABSTRACT

The present disclosure provides a scanning imaging part, and related products and methods. The scanning imaging part includes a transparent body, a light blocking ink, a charged liquid droplet, and a microfluidic component. The transparent body may include a first face and a second face opposite to each other. An image sensor may be arranged on the second face. The charged liquid droplet and the light blocking ink may be insoluble with each other, and may be filled in a liquid flow channel. The charged liquid droplet may transmit at least a part of light incident from the first face through the charged liquid droplet and to the image sensor. The microfluidic component may drive the charged liquid droplet to move in the liquid flow channel. Thereby, light incident from the first face may be scanned via the charged liquid droplet and form a scanning image by the image sensor.

20 Claims, 9 Drawing Sheets

(51) Int. Cl.
*G02B 26/02* (2006.01)
*H04N 5/225* (2006.01)

(56) References Cited

U.S. PATENT DOCUMENTS

| | | | |
|---|---|---|---|
| 2010/0187115 A1* | 7/2010 | Posner | F04B 19/00 |
| | | | 204/627 |
| 2012/0045787 A1* | 2/2012 | Boettiger | G01N 21/03 |
| | | | 435/29 |
| 2016/0266521 A1 | 9/2016 | Inour et al. | |
| 2017/0249494 A1 | 8/2017 | Zhang et al. | |
| 2017/0351898 A1 | 12/2017 | Zhang | |

FOREIGN PATENT DOCUMENTS

| | | |
|---|---|---|
| CN | 205540913 U | 8/2016 |
| CN | 105989325 A | 10/2016 |
| CN | 106336725 A | 1/2017 |
| CN | 205910951 U | 1/2017 |
| CN | 107451518 A | 12/2017 |
| CN | 107819981 A | 3/2018 |
| CN | 108848283 A | 11/2018 |
| EP | 3467811 A1 | 4/2019 |

OTHER PUBLICATIONS

European search report issued in corresponding European application No. EP19178109, dated Oct. 31, 2019 (5 pages).
English Translation of Chinese first office action and search report, 201810564141.4, dated Mar. 28, 2019(5 pages).

* cited by examiner strong electric field on the face 131   132   131   133

114

SCANNING IMAGING PART, SCANNING IMAGING DEVICE, AND ELECTRONIC APPARATUS

CROSS-REFERENCE TO RELATED APPLICATION(S)

This application claims priority to Chinese Patent Application No. 201810564141.4, filed on Jun. 4, 2018, the contents of which is herein incorporated by reference in its entirety.

TECHNICAL FIELD

The described embodiments relate to a communication apparatus technology, and more particularly, to a scanning imaging part, a scanning imaging device, a manufacturing method for a scanning imaging part, a method for scanning imaging, an electronic apparatus, and a gesture recognition method.

BACKGROUND

In the related art, cameras are devices that use lenses to achieve imaging. In related solutions, multiple sets of lenses are required to cooperate and light sensors are very dense, resulting in a large thickness of a camera module. The camera module with a large thickness is not conducive to manufacture electronic products to be thin, and is not conducive to achieve a full screen with a screen ratio of more than 95%. An area is left for the camera, which affects user experience.

Moreover, when a camera solution applied to mobile device gesture recognition is a wide-angle camera, a front camera is required and the front camera protrudes from a face of a glass cover. This camera solution will result in severe edge image distortion and is not conducive to gesture recognition.

SUMMARY

A scanning imaging part according to an embodiment of the present disclosure, includes a transparent body including a first face and a second face opposite to each other, wherein a closed liquid flow channel is arranged adjacent to the first face, and an image sensor is arranged on the second face; a light blocking ink filled in the liquid flow channel configured to block light incident from the first face; a charged liquid droplet arranged in the liquid flow channel, wherein the charged liquid droplet is transparent and insoluble with the light blocking ink, and is configured to transmit at least a part of the light incident from the first face through the charged liquid droplet and to the image sensor; and a microfluidic component arranged on the first face of the transparent body, and configured to drive the charged liquid droplet to move in the liquid flow channel, so that light incident from the first face is scanned via the charged liquid droplet and forms a scanning image by the image sensor.

A scanning imaging device according to an embodiment of the present disclosure, includes at least one scanning imaging part. Each scanning imaging part includes a transparent body including a first face and a second face opposite to each other, wherein a closed liquid flow channel is arranged adjacent to the first face, and an image sensor is arranged on the second face; a light blocking ink filled in the liquid flow channel configured to block light incident from the first face; a charged liquid droplet arranged in the liquid flow channel, wherein the charged liquid droplet is transparent and insoluble with the light blocking ink, and is configured to transmit at least a part of the light incident from the first face through the charged liquid droplet and to the image sensor; and a microfluidic component arranged on the first face of the transparent body, and configured to drive the charged liquid droplet to move in the liquid flow channel, so that light incident from the first face is scanned via the charged liquid droplet and forms a scanning image by the image sensor.

An electronic apparatus according to an embodiment of the present disclosure, includes a housing; a display assembly mounted on the housing; and a scanning imaging device including at least one scanning imaging part. Each scanning imaging part includes a transparent body including a first face and a second face opposite to each other, wherein a closed liquid flow channel is arranged adjacent to the first face, and an image sensor is arranged on the second face; a light blocking ink filled in the liquid flow channel configured to block light incident from the first face; a charged liquid droplet arranged in the liquid flow channel, wherein the charged liquid droplet is transparent and insoluble with the light blocking ink, and is configured to transmit at least a part of the light incident from the first face through the charged liquid droplet and to the image sensor; and a microfluidic component arranged on the first face of the transparent body, and configured to drive the charged liquid droplet to move in the liquid flow channel, so that light incident from the first face is scanned via the charged liquid droplet and forms a scanning image by the image sensor. The scanning imaging device is arranged along any side of the display screen assembly; and a light incident face of the scanning imaging device is smoothly connected to a display face of the display screen assembly.

BRIEF DESCRIPTION OF DRAWINGS

In order to more clearly explain the technical solution in the embodiment of the present disclosure or the prior art, the following will briefly introduce the drawings needed in the description of the embodiment or the prior art. Obviously, the drawings in the following description are only some embodiments of the disclosure. For those of ordinary skill in the art, other drawings can be obtained according to these drawings without creative efforts.

DETAILED DESCRIPTION

Figure 1:
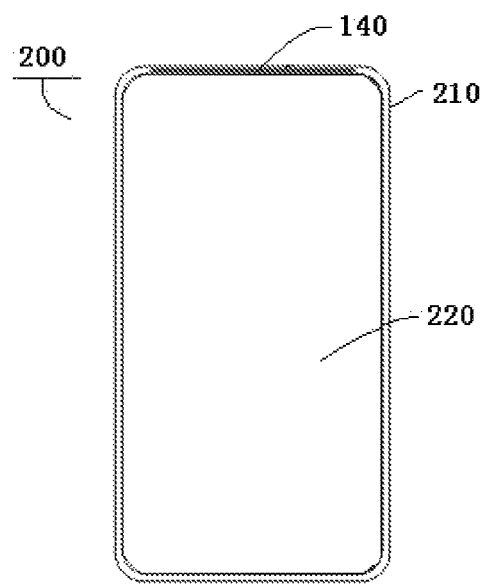
FIG. 1 is a structural illustration of an electronic apparatus in accordance with an embodiment in the present disclosure.

The embodiments of the present disclosure are described in detail below, and the examples of the embodiments are illustrated in the drawings, wherein the same or similar reference numerals are used to refer to the same or similar elements or elements having the same or similar functions. The embodiments described below with reference to the accompanying drawings are intended to be illustrative only, and are not to be construed as limiting.

In the description of the present disclosure, it is to be understood that terms such as "center", "longitudinal", "lateral", "length", "width", "thickness", "upper", "lower", "front", "rear", "left", "right", "vertical", "horizontal", "top", "bottom", "inner", "outer", and the like, refer to the orientations and locational relations illustrated in the accompanying drawings. Thus, these terms used here are only for describing the present disclosure and for describing in a simple manner, and are not intended to indicate or imply that the device or the elements are disposed to locate at the specific directions or are structured and performed in the specific directions, which could not to be understood as limiting the present disclosure. In addition, features defining "first" and "second" may include one or more of the features, either explicitly or implicitly. In the description of the present disclosure, "a plurality" means two or more unless otherwise stated.

In the present disclosure, unless specified or limited, otherwise, terms "mounted", "connected", "coupled", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by one skilled in the art depending on specific contexts.

The present disclosure relates to a scanning imaging part. The scanning imaging part includes: a transparent body including a first face and a second face opposite to each other, wherein a closed liquid flow channel is defined in the transparent body along the first face, and an image sensor is arranged on the second face; a light blocking ink filled in the liquid flow channel and configured to block light on a side of the first face; a charged liquid droplet arranged in the liquid flow channel, wherein the charged liquid droplet is transparent and insoluble with the light blocking ink, and is configured to transmit at least a part of light on one side of the first face through the light blocking ink; and a microfluidic component arranged on the first face of the transparent body, and configured to drive the charged liquid droplet to move in the liquid flow channel, so that light on the one side of the first face is scanned via the charged liquid droplet to penetrate the light blocking ink, to form a scanning image by the image sensor.

In an embodiment, the transparent body is a plate body in a trapezoidal shape. Aside face on the plate body corresponding to a lower base of the trapezoidal shape is a curved face, and a side face on the plate body corresponding to an upper base of the trapezoidal shape is a plane. The lower base face is the first face, and the upper base face is the second face.

In an embodiment, the transparent body is a sector plate body; and an outer side face of the sector plate body is the first face, and an inner side face of the sector plate body is the second face.

In an embodiment, the liquid flow channel extends along a curved path corresponding to the first face and is covered by the first face; and a photosensitive face of the image sensor is arranged toward the second face.

In an embodiment, a distance between a center of the liquid flow channel along the curved path corresponding to the first face, and the first face, is constant.

In an embodiment, the image sensor is a strip shape; and a projection of the liquid flow channel on the second face is located on the image sensor.

In an embodiment, a diameter of the charged liquid droplet is greater than or equal to an inner diameter of the liquid flow channel.

In an embodiment, the microfluidic component is bonded to the first face; and a projection of the liquid flow channel on the first face is located on the microfluidic component.

In an embodiment, the microfluidic component includes: a first transparent conductive film; a second transparent conductive film; and a transparent insulating film. The first transparent conductive film is bonded to the first face; and the second transparent conductive film is bonded to the first transparent conductive film by the transparent insulating film.

In an embodiment, the first transparent conductive film includes a plurality of indium tin oxide wirings extending along a first direction; the second transparent conductive film includes a plurality of indium tin oxide wirings extending along a second direction; the plurality of indium tin oxide wirings extending along the first direction and the plurality of indium tin oxide wirings extending along the second direction are arranged across to each other, and are insulated from each other.

In an embodiment, the transparent body is glass.

In an embodiment, the light blocking ink is an oily insulating ink.

In an embodiment, the charged liquid droplet is in close contact with an inner wall face of the liquid flow channel.

The present disclosure further relates to a scanning imaging device. The scanning imaging device includes at least one scanning imaging part described above.

In an embodiment, number of the scanning imaging parts is plural; a plurality of the scanning imaging parts are arranged side by side along a third direction; and the liquid flow channel extends along a fourth direction, and the third direction is perpendicular to the fourth direction.

In an embodiment, the plurality of the scanning imaging parts shares the same image sensor.

In an embodiment, a light blocking layer is arranged between any two adjacent scanning imaging parts.

In an embodiment, the scanning imaging device further includes a driving chip. The driving chip is communicatively connected to the microfluidic component and the image sensor.

The present disclosure further relates to a manufacturing method for a scanning imaging part described above. The method includes: processing the liquid flow channel in the transparent body; sealing the light blocking ink and the charged liquid droplet in the liquid flow channel; forming the image sensor by a glass-based process, and bonding the image sensor to a face of the transparent body.

In an embodiment, the transparent body is glass; and the liquid flow channel is formed by a hydrofluoric acid etching process.

In an embodiment, the sealing the light blocking ink and the charged liquid droplet in the liquid flow channel includes: injecting the light blocking ink into the liquid flow channel; injecting the charged liquid droplet into the liquid flow channel; and sealing the liquid flow channel by a frame sealant material or a glass bonding process.

The present disclosure further relates to a method for scanning imaging applied to a scanning imaging part described above. The method includes: moving the charged liquid droplet in the liquid flow channel under control of the microfluidic component, so that light on one side of the first face is scanned via the charged liquid droplet to the image sensor; scanning a plurality of external images in different angles by the image sensor; and subjecting the plurality of external images in different angles to an integral delay superposition, to form a target image.

The present disclosure further relates to an electronic apparatus. The electronic apparatus includes: a housing; a display assembly mounted on the housing; and a scanning imaging device describe above. The scanning imaging device is arranged along any side of the display screen assembly; and a light incident face of the scanning imaging device is smoothly connected to a display face of the display screen assembly.

The present disclosure further relates to a gesture recognition method applied to an electronic apparatus described above. The gesture recognition method includes: acquiring a plurality of gesture images in different angles during a gesture operation, by the scanning imaging device; subjecting the plurality of gesture images in different angles to an integral delay superposition, to form a target gesture image; determining an operation instruction corresponding to the gesture operation according to the target gesture image, and triggering the electronic apparatus to respond to the operation instruction.

The present disclosure further relates to a scanning imaging part. The scanning imaging part includes: a transparent body including a first face and a second face opposite to each other, wherein a closed liquid flow channel is defined in the transparent body adjacent to the first face, and an image sensor is arranged on the second face; a light blocking ink filled in the liquid flow channel and configured to block light incident from the first face; a charged liquid droplet arranged in the liquid flow channel, wherein the charged liquid droplet is transparent and insoluble with the light blocking ink, and is configured to transmit at least a part of the light incident from the first face through the charged liquid droplet and to the image sensor; and a microfluidic component arranged on the first face of the transparent body, and configured to drive the charged liquid droplet to move in the liquid flow channel, so that light incident from the first face is scanned via the charged liquid droplet and forms a scanning image by the image sensor.

In an embodiment, the first face is a curved face. The liquid flow channel extends along a curved path corresponding to the first face and is covered by the first face; and a photosensitive face of the image sensor is arranged toward the second face.

In an embodiment, the image sensor is a strip shape, and is configured to receive light transmitted by the charged liquid droplet at any location in the liquid flow channel.

In an embodiment, a projection of the liquid flow channel on the second face is at least partially overlapped with a projection of the image sensor on the second face.

In an embodiment, the microfluidic component is bonded to the first face.

In an embodiment, a projection of the liquid flow channel on the first face is at least partially overlapped with a projection of the microfluidic component on the first face.

The present disclosure further relates to a scanning imaging device. The scanning imaging device includes at least one scanning imaging part. Each scanning imaging part includes: a transparent body including a first face and a second face opposite to each other, wherein a closed liquid flow channel is defined in the transparent body adjacent to the first face, and an image sensor is arranged on the second face; a light blocking ink filled in the liquid flow channel and configured to block light incident from the first face; a charged liquid droplet arranged in the liquid flow channel, wherein the charged liquid droplet is transparent and insoluble with the light blocking ink, and is configured to transmit at least a part of the light incident from the first face through the charged liquid droplet and to the image sensor; and a microfluidic component arranged on the first face of the transparent body, and configured to drive the charged liquid droplet to move in the liquid flow channel, so that light incident from the first face is scanned via the charged liquid droplet and forms a scanning image by the image sensor.

The present disclosure further relates to an electronic apparatus. The electronic apparatus includes: a housing; a display assembly mounted on the housing; and a scanning imaging device including at least one scanning imaging part. Each scanning imaging part includes: a transparent body including a first face and a second face opposite to each other, wherein a closed liquid flow channel is defined in the transparent body adjacent to the first face, and an image sensor is arranged on the second face; a light blocking ink filled in the liquid flow channel and configured to block light incident from the first face; a charged liquid droplet arranged in the liquid flow channel, wherein the charged liquid droplet is transparent and insoluble with the light blocking ink, and is configured to transmit at least a part of the light incident from the first face through the charged liquid droplet and to the image sensor; and a microfluidic component arranged on the first face of the transparent body, and configured to drive the charged liquid droplet to move in the liquid flow channel, so that light incident from the first face is scanned via the charged liquid droplet and forms a scanning image by the image sensor. The scanning imaging device is arranged along any side of the display screen assembly; and a light incident face of the scanning imaging device is smoothly connected to a display face of the display screen assembly.

In an embodiment, the light incident face of the scanning imaging device is tangent to the display face of the display screen assembly.

The scanning imaging part 100 according to an embodiment of the present disclosure will be described in detail below with reference to the accompanying drawings. The scanning imaging part 100 may include a transparent body 110, a light blocking ink 120, a charged liquid droplet 121, and a microfluidic component 130.

Figure 4:
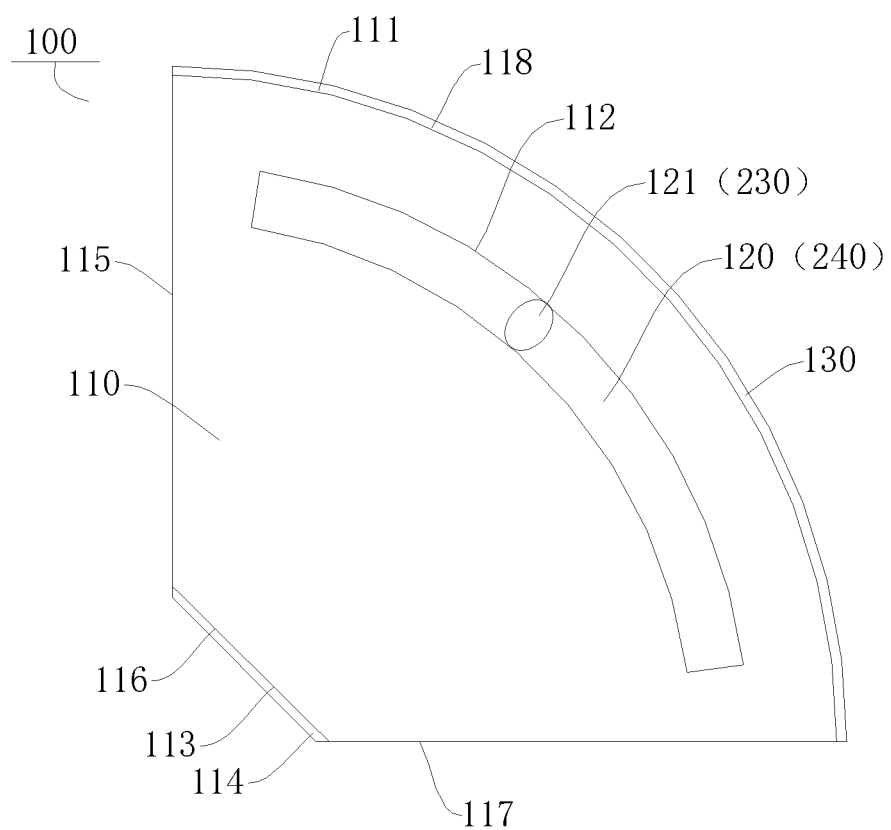
FIG. 4 is a structural illustration of a scanning imaging part in accordance with an embodiment in the present disclosure.
Figure 5:
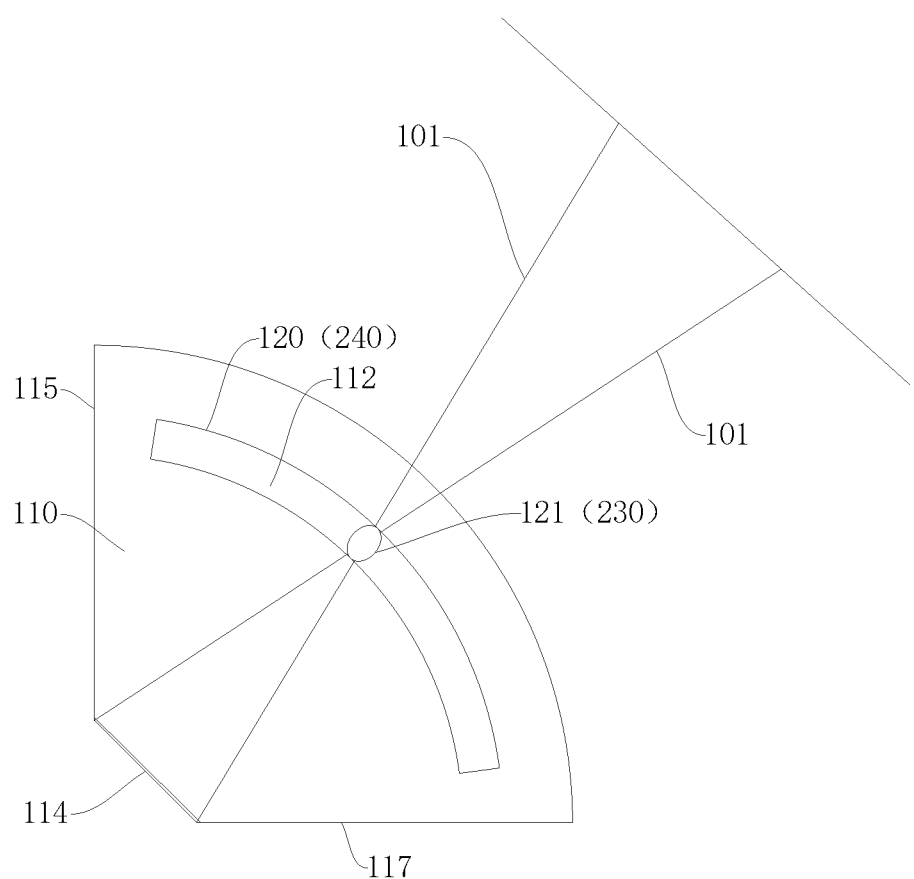
FIG. 5 is a light path illustration in micro slit imaging of a scanning imaging part in accordance with an embodiment in the present disclosure.

Referring to FIG. 4 and FIG. 5, the transparent body 110 may include a first face 111 and a second face 113 opposite to each other. A closed liquid flow channel 112 may be defined in the transparent body 110. The liquid flow channel 112 may be arranged along the first face 111 of the transparent body 110. An image sensor 114 may be arranged on the second face 113. A light blocking ink 120 may be filled in the liquid flow channel 112 and may be configured to block light from the first face 111. A charged liquid droplet 121 may be arranged in the liquid flow channel 112. The charged liquid droplet 121 may be transparent and insoluble with the light blocking ink 120. The charged liquid droplet 121 may be configured to transmit at least a part of light from the first face 111 through the light blocking ink 120.

Referring to FIG. 4, a microfluidic component 130 may be arranged on the first face 111 of the transparent body 110. The microfluidic component 130 may be configured to drive the charged liquid droplet 121 to move in the liquid flow channel 112, so that light on the one side of the first face 111 may be scanned via the charged liquid droplet 121 to penetrate the light blocking ink 120, to form a scanning image by the image sensor 114.

The microfluidic component 130 may be communicatively connected to the charged liquid droplet 121, to control the charged liquid droplet 121 to move. The microfluidic component 130 may be arranged on a face of the transparent body 110. The microfluidic component 130 may drive the charged liquid droplet 121 to operate by an electromagnetic field induction, a N-S magnetic field or the like. The "communicatively connected" herein may be understood as a certain connection or linkage relationship between two components by an electrical signal, an electromagnetic signal, an electric field, or an electric field force.

It should be noted that, a structure may be formed on transparent body 110 to realize pinhole imaging (or called micro slit imaging) by a property in light transmission of the charged liquid droplet 121. For example, referring to FIG. 5, when light 101 on one side of the charged liquid droplet 121 is irradiated to the charged liquid droplet 121, a part of the light 101 may enter into the transparent body 110 via the charged liquid droplet 121. The part of the light 101 may be acquired by the image sensor 114 located on the other side of the charged droplet 121, to realize acquiring image information.

Figure 6:
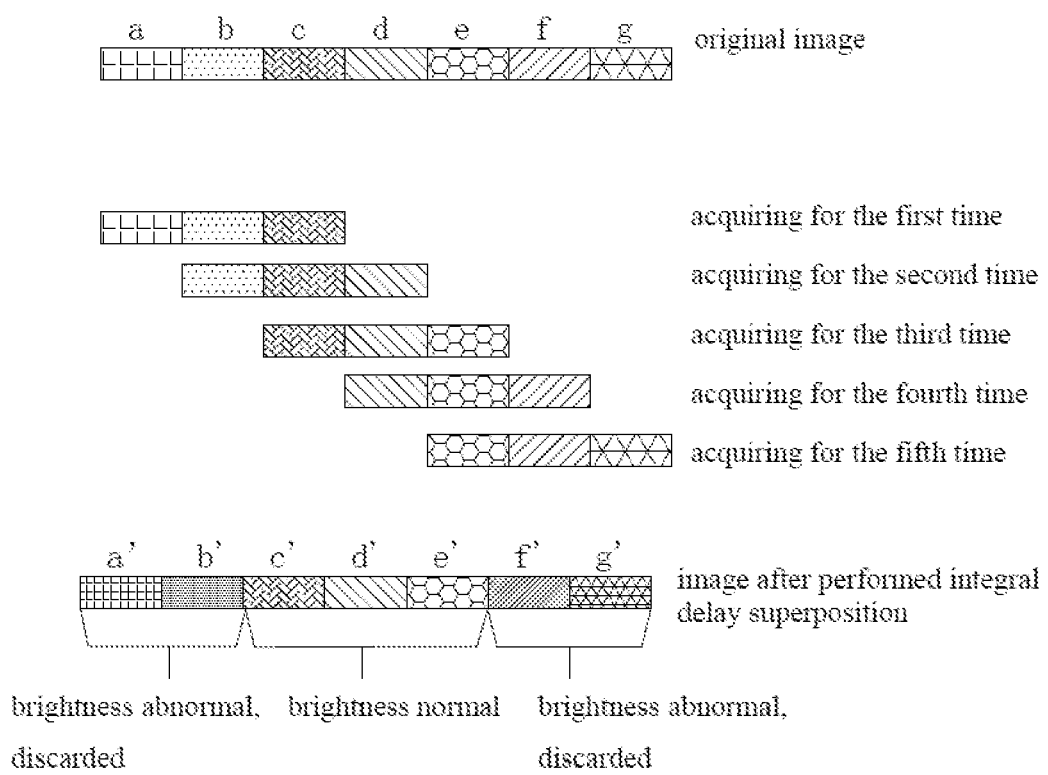
FIG. 6 is a technical drawing of an integral delay superposition.

When the microfluidic component 130 controls to change a position of the charged liquid droplet 121 for imaging by the charged liquid droplet 121, scanning imaging in different directions may be realized. The image sensor 114 of the electronic apparatus 200 may perform an integral delay superposition on images acquiring by the micro slit imaging, to form a complete image. It should be noted that, the integral delay superposition is a technology as shown in FIG. 6. Different images acquired may be misaligned and superposed to form a complete image.

For example, in the example shown in FIG. 6, an original image is sequentially divided into seven regions a, b, c, d, e, f, and g for convenience of understanding. When image information is acquired for the first time, the image sensor 114 may present an image of a, b, and c regions. When the image information is acquired for the second time, the image sensor 114 may present an image of b, c, and d regions. When the image information is acquired for the third time, the image sensor 114 may present an image of c, d, and e regions. When the image information is acquired for the fourth time, the image sensor 114 may present an image of d, e, and f regions. When the image information is acquired for the fifth time, the image sensor 114 may present an image of e, f, and g regions. The images acquired by multiple scans may be performed an integral delay superposition, to form a complete image. For convenience of description, the images formed after superposition may be sequentially divided into a', b', c', d', e', f', g' seven regions. The regions a', b', f', g' may be discarded because its brightness is abnormal.

In the scanning imaging part 100 according to an embodiment of the present disclosure, the charged liquid droplet 121 and the light blocking ink 120 which are insoluble with each other, may be arranged in the liquid flow channel 112, to form a structure which may realize pinhole imaging (or called micro slit imaging) by a property in light transmission of the charged liquid droplet 121, so that image information may be acquired by the principle of pinhole imaging. Further, the charged liquid droplet 121 may be set as a movable component, so that more information of light 101 may be acquired, and thus a more complete picture effect may be presented.

In some embodiments of the present disclosure, the image sensor 114 may be a light sensor. Further, the light sensor may be an array light sensor, and the array light sensor may be bonded to the second face 113. Further, referring to FIG. 9, the light sensor may be a strip shape. Thereby, a structure of the image sensor 114 may be simplified, to the image sensor 114 arranged on the second face 113 easily. The image sensor 114 may be a strip shape. A projection of the liquid flow channel 112 on the second face 113 may be located on the image sensor 114. Thereby, image information carried by the light 101 may be transmitted to the image sensor 114 by the principle of pinhole imaging.

Referring to FIG. 4, the liquid flow channel 112 may extend in a curved shape, thereby a scanning range of the scanning imaging part 100 may be increased, so that more image information may be acquired. It should be noted that, what shape does the liquid flow channel 112 extend in, is not limited herein. For example, in some embodiments, the liquid flow channel 112 may extend in a straight line. In some embodiments of the present disclosure, the liquid flow channel 112 may have a length in a range of 10 to 100 micrometers. Further, in order to be able to adapt the scanning imaging part 100 to more electronic apparatus 200, the liquid flow channel 112 may have a length in a range of 20 to 40 micrometers. Further, the liquid flow channel 112 may have a length of 30 micrometers.

In some embodiments of the present disclosure, number of the liquid flow channel 112 may be plural, and number of the charged liquid droplet 121 may also be plural. A plurality of charged liquid droplets 121 and a plurality of liquid flow channels 112 may be in one-to-one correspondence, so that more image information may be acquired.

In some embodiments of the present disclosure, the charged liquid droplets 121 may have a diameter in a range of 2 to 7 micrometers. Thereby, the diameter of the charged liquid droplets 121 may facilitate the pinhole imaging, and an imaging effect of the scanning imaging part 100 and image quality may be improved. Further, it has been experimentally verified that when the diameter of the charged liquid droplets 121 is 3 micrometers, the imaging effect of the scanning imaging part 100 may be better.

Figure 7:
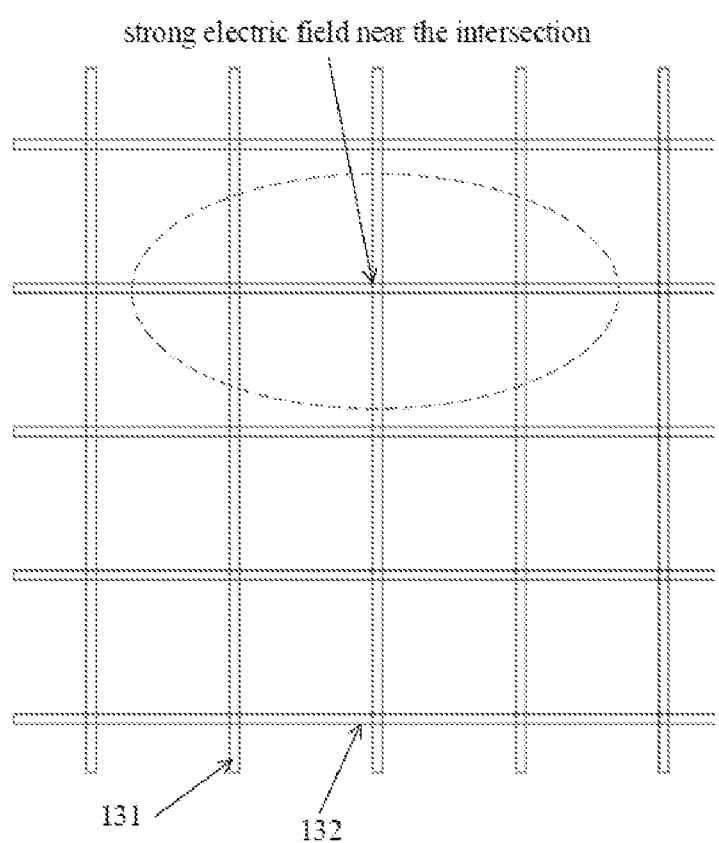
FIG. 7 is a structural illustration of a microfluidic membrane in accordance with an embodiment in the present disclosure.
Figure 8:
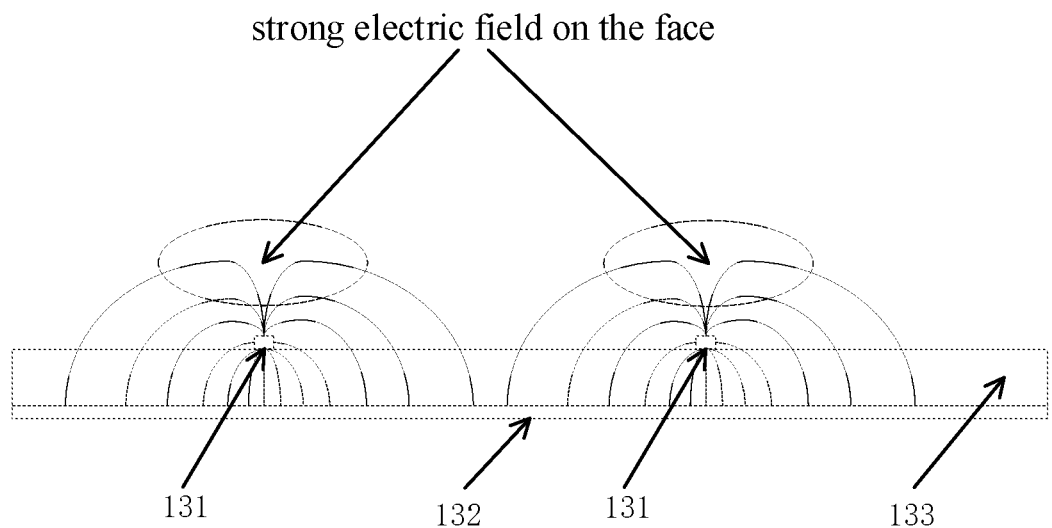
FIG. 8 is a microfluidic electric field distribution diagram.

In order to conveniently control the charged liquid droplet 121 to move, the microfluidic component 130 may be a microfluidic membrane. The microfluidic membrane may be bonded to the first face 111 of the transparent body 110, and a projection of the liquid flow channel on the first face may be located on the microfluidic component 130, thereby the microfluidic component 130 may be conveniently control the charged liquid droplet 121 to move. It should be noted that, the microfluidic membrane may have a structure as shown in FIG. 7, and the microfluidic electric field may have a distribution as shown in FIG. 8. The microfluidic membrane may include two transparent conductive indium tin oxide (ITO) films 131, 132 and a transparent insulating passivation layer (PVX) 133 between two the conductive ITO films, the PVX may be silicon nitride. A voltage may be increased between a conductive ITO film 131 in a vertical direction and a conductive ITO film 132 in a lateral direction. A strong electric field that may penetrate the transparent body 110 may be generated between the two conductive ITO films, to control the charged liquid droplet 121 (the charged liquid droplet 121 may move in a direction of an electric field line). Thereby, a position of the charged liquid droplet 121 may be controlled by an electrical signal.

Further, the microfluidic membrane may be a microfluidic thin membrane. The microfluidic membrane may have a structure as shown in FIG. 7, and the microfluidic electric field may have a distribution as shown in FIG. 8. The microfluidic membrane may include a transparent insulating PVX (silicon nitride) and two layers of crossed transparent conductive indium tin oxide (ITO). The transparent insulating PVX (silicon nitride) may be located between the two layers of ITO. One layer of the conductive ITO film may include ITO wirings 131 extending in a first direction, and the other layer of the conductive ITO film may include ITO wirings 131 extending in a second direction. The first direction and the second direction may be different. For example, referring to FIG. 7, the ITO wirings 131 in a vertical direction may form a transparent conductive ITO film, and The ITO wirings 131 in a lateral direction may form a transparent conductive ITO film. The transparent insulating PVX (silicon nitride) film may be arranged between the two transparent conductive ITO films.

In some embodiments of the present disclosure, the microfluidic component 130 may include a first transparent conductive film, a second transparent conductive film, and a transparent insulating film. The first transparent conductive film may be bonded to the first face 111. The second transparent conductive film may be bonded to the first transparent conductive film by the transparent insulating film. Further, the first transparent conductive film may include a plurality of ITO wirings 131 extending along a first direction. The second transparent conductive film may include a plurality of ITO wirings extending along a second direction. The plurality of ITO wirings 131 extending along the first direction, and the plurality of ITO wirings 132 extending along the second direction, may be arranged across to each other, and are insulated from each other.

The transparent body may be a transparent glass. A voltage may be increased between the ITO wirings 131 in the vertical direction and the ITO wirings 131 in the lateral direction. A strong electric field that may penetrate the glass may be generated between the two ITO films, to control the charged liquid droplet 121 (the charged liquid droplet 121 may move in a direction of an electric field line). Thereby, a position of the charged liquid droplet 121 may be controlled by an electrical signal.

In some embodiments of the present disclosure, the transparent body 110 may be a plate body in a trapezoidal shape. A side face on the plate body corresponding to a lower base of the trapezoidal shape may be a curved face. A side face on the plate body corresponding to an upper base of the trapezoidal shape is a plane. The lower base face may be the first face, and the upper base face may be the second face. For example, referring to FIG. 4 and FIG. 5, a cross section of the transparent body 110 may be substantially a trapezoidal shape and may include a first connecting portion 115, a second connecting portion 116, a third connecting portion 117, and fourth connecting portion 118. The second connecting portion 116 may be the upper base of the trapezoidal shape. The fourth connecting portion 118 may be the lower base of the trapezoidal shape. The first connecting portion 115 and the third connecting portion 117 may be lateral sides of the trapezoidal shape. A side face on the plate body corresponding to second connecting portion 116 may be the second face 113. A side face on the plate body corresponding to fourth connecting portion 118 may be the first face 111. The microfluidic component 130 may be in contact with the second connecting portion 116. The image sensor 114 may be in contact with the fourth connecting portion 118. The second connecting portion 116 may be opposite to the fourth connecting portion 118. The fourth connecting portion 118 may be curved. The second connecting portion 116 may be straight. Length of the fourth connecting portion 118 may be greater than length of the second connecting portion 116. Thereby, volume of the scanning imaging part 100 may be reduced, and the scanning imaging part 100 may be arranged conveniently.

Figure 11:
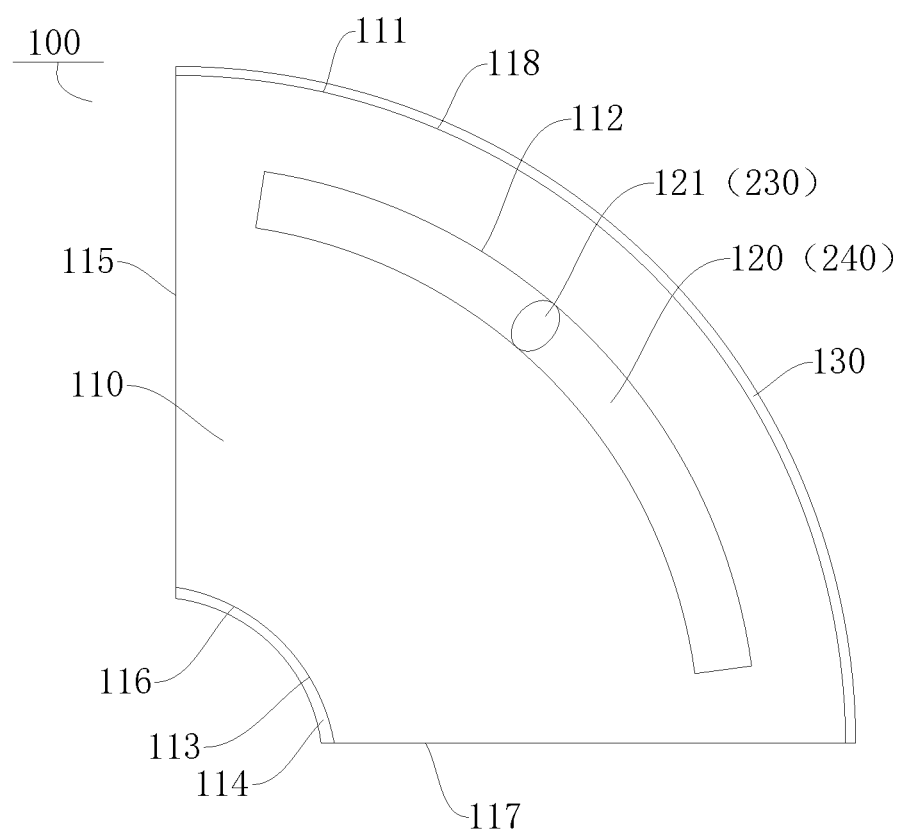
FIG. 11 is a structural illustration of a scanning imaging part in accordance with an embodiment in the present disclosure.

It should be noted that, the shape of the second connecting portion 116 is not limited herein. For example, referring to FIG. 11, the second connecting portion 116 and the fourth connecting portion 118 may be both curved, and a central angle of the fourth connecting portion 118 may be greater than or equal to a central angle of the second connecting portion 116. Further, the second connecting portion 116 may be parallel to the fourth connecting portion 118.

Figure 12:
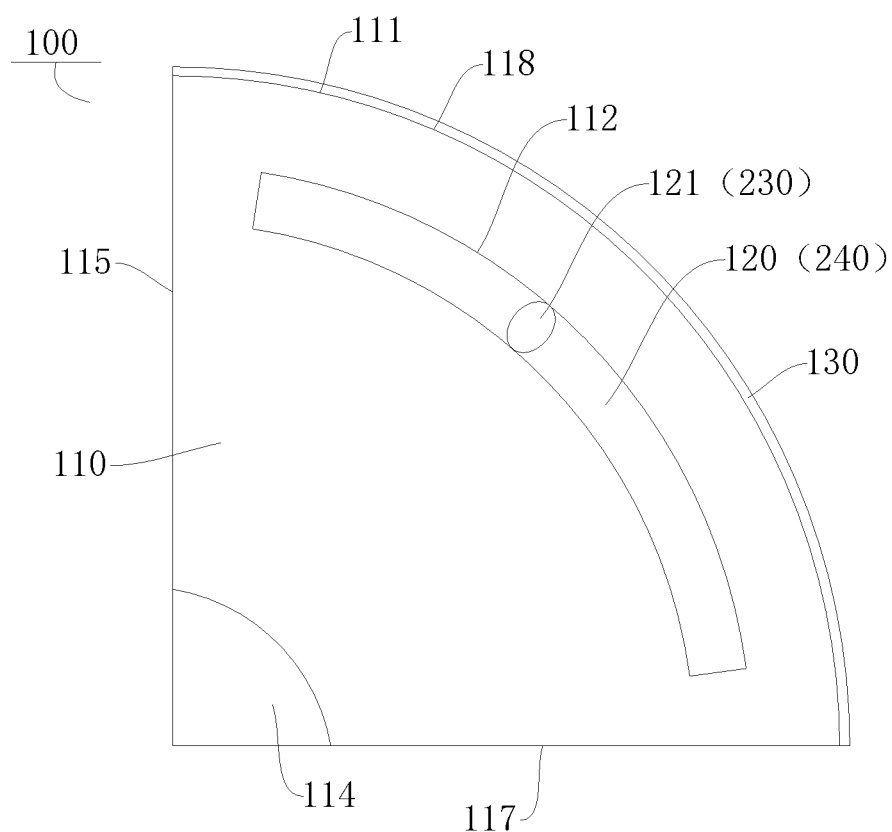
FIG. 12 is a structural illustration of a scanning imaging part in accordance with an embodiment in the present disclosure.

Referring to FIG. 12, the transparent body 110 may be a sector plate body. An outer side face of the sector plate body may be the first face 111. An inner side face of the sector plate body may be the second face 113. It should be noted that, referring to FIG. 12, the image sensor 114 may be bonded to the inner side face of the sector plate body of the transparent body 110 to be one part the sector plate body. In some embodiments of the present disclosure, referring to FIG. 4 and FIG. 5, the first connecting portion 115 and the third connecting portion 117 may both extend in a straight line. Thereby, a cross section of the transparent body 110 may be a sector shape, so that the transparent body 110 may be arranged on the electronic apparatus 200 easily, to save space for the scanning imaging part 100.

In some embodiments of the present disclosure, the transparent body 110 may be glass. The glass may be a transparent, which has good property in light transmission, so that the glass may be suitable for the scanning imaging part 100 to image. Further, the light blocking ink 120 may be an oily insulating ink. It should be noted that, the oily insulating ink has a good property in light blocking, and the oily insulating ink is insoluble with the charged liquid droplet 121, so that the oily insulating ink may be suitable for pinhole imaging. In some embodiments of the present disclosure, referring to FIG. 4, a diameter of the charged liquid droplet 121 may be greater than or equal to an inner diameter of the liquid flow channel 112, so that the diameters may be suitable for the light 101 to pass through the charged liquid droplet 121. In other words, referring to FIG. 4, the charged liquid droplet 121 may be in close contact with an inner wall face of the liquid flow channel 112, so that the diameter may be suitable for pinhole imaging.

In some embodiments of the present disclosure, referring to FIG. 4, the liquid flow channel 112 may extend along a curved path corresponding to the first face 111 and may be covered by the first face 111. A photosensitive face of the image sensor 11 may be arranged toward the second face 113. Thereby, the charged liquid droplet 121 may move along the curved liquid flow channel 112, to increase a view angle for scanning, so that the image sensor 11 may acquire image information at a larger view angle. In some embodiments of the present disclosure, referring to FIG. 4, a distance between a center of the liquid flow channel 112 along the curved path corresponding to the first face 111, and the first face 111, may be constant. When the image information is acquired by the principle of pinhole imaging, an image may be smoothly presented on the image sensor 11, so that an imaging effect of the scanning imaging part may be improved.

Figure 10:
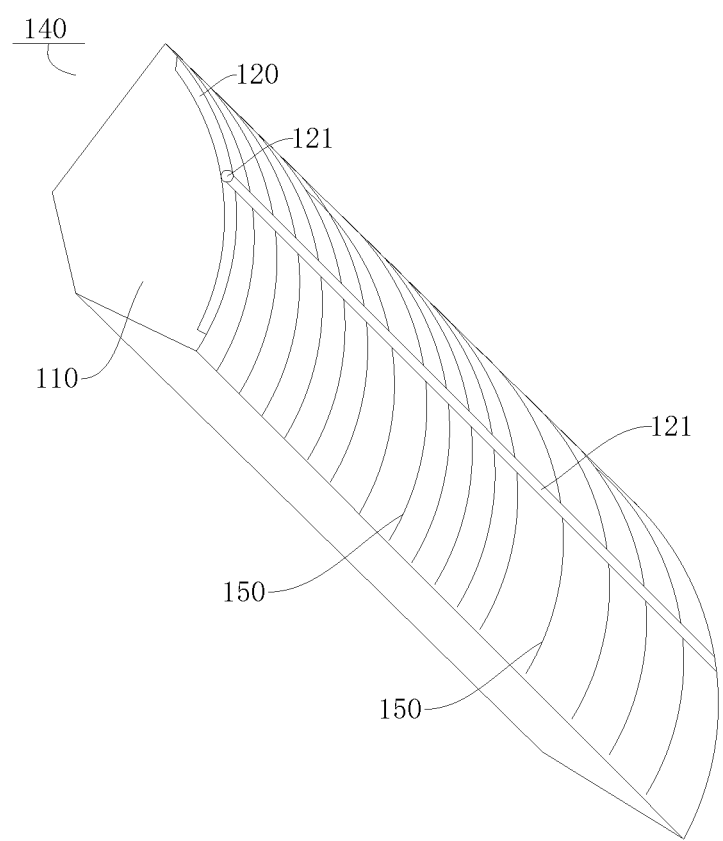
FIG. 10 is a structural illustration of a scanning imaging device in accordance with an embodiment in the present disclosure, which includes a plurality of channels.

Referring to FIG. 10, the scanning imaging device 140 according to an embodiment of the present disclosure, may include at least one of the above-mentioned scanning imaging part 100.

In the scanning imaging device 140 according to an embodiment of the present disclosure, the charged liquid droplet 121 and the light blocking ink 120 which are insoluble with each other, may be arranged in the liquid flow channel 112, to form a structure on the transparent body 110 which may realize pinhole imaging (or called micro slit imaging) by a property in light transmission of the charged liquid droplet, so that image information may be acquired by the principle of pinhole imaging. Further, the charged liquid droplet 121 may be set as a movable component, so that more light 101 information may be acquired, and thus a more complete picture effect may be presented.

In some embodiments of the present disclosure, referring to FIG. 10, number of the scanning imaging parts 100 may be plural. A plurality of the scanning imaging parts 100 may be arranged side by side along a third direction. The liquid flow channel 112 may extend along a fourth direction. The third direction may be perpendicular to the fourth direction. In some embodiments, the plurality of the scanning imaging parts 100 may share the same image sensor 114.

In order to avoid interference between two adjacent scanning imaging parts 100, in some embodiments, referring to FIG. 10, a light blocking layer 150 may be arranged between any two adjacent scanning imaging parts 100. In some embodiments, the scanning imaging device 140 may further include a driving chip. The driving chip may be communicatively connected to the microfluidic component 130 and the image sensor 114.

The manufacturing method for a scanning imaging part according to an embodiment of the present disclosure may be described below. A scanning imaging part may be the above-mentioned scanning imaging part. For example, the scanning imaging part may include a transparent body, a light blocking ink, a charged liquid droplet, and a microfluidic component. The transparent body may include a first face and a second face opposite to each other. A closed liquid flow channel may be arranged along the first face. An image sensor may be arranged on the second face. The light blocking ink may be filled in the liquid flow channel and may be configured to block light on a side of the first face. The charged liquid droplet may be arranged in the liquid flow channel. The charged liquid droplet may be transparent and insoluble with the light blocking ink, and may be configured to transmit at least a part of light on one side of the first face through the light blocking ink. The microfluidic component may be arranged on the first face of the transparent body, and may be configured to drive the charged liquid droplet to move in the liquid flow channel. Thereby, light on the one side of the first face may be scanned via the charged liquid droplet to penetrate the light blocking ink, to form a scanning image by the image sensor.

The manufacturing method for the scanning imaging part may include operations described as following.

The liquid flow channel may be processed in the transparent body.

The light blocking ink and the charged liquid droplet may be sealed in the liquid flow channel.

The image sensor may be formed by a glass-based process, and bonding the image sensor to a face of the transparent body.

In the manufacturing method for the scanning imaging part according to an embodiment of the present disclosure, processes of manufacturing the scanning imaging part may be simplified, and an imaging effect of the scanning imaging part may be improved.

In some embodiments of the present disclosure, the transparent body may be glass. The liquid flow channel may be processed by an etching process, thereby processes of the liquid flow channel may be simplified, and yield may be improved. Methods of processing the liquid flow channel may be not limited herein. For example, in some embodiments of the present disclosure, the liquid flow channel may also be formed by a hydrofluoric acid etching process.

In some embodiments of the present disclosure, the operation that the light blocking ink and the charged liquid droplet may be sealed in the liquid flow channel, include operations described as following. The light blocking ink may be injected into the liquid flow channel. The charged liquid droplet may be injected into the liquid flow channel. The liquid flow channel may be sealed by a frame sealant material or a glass bonding process.

In some embodiments of the present disclosure, the liquid flow channel may be sealed by a frame sealant material or a glass bonding process. Thereby, tightness of the liquid flow channel may be improved, and service life of the scanning imaging part may be prolonged.

Figure 9:
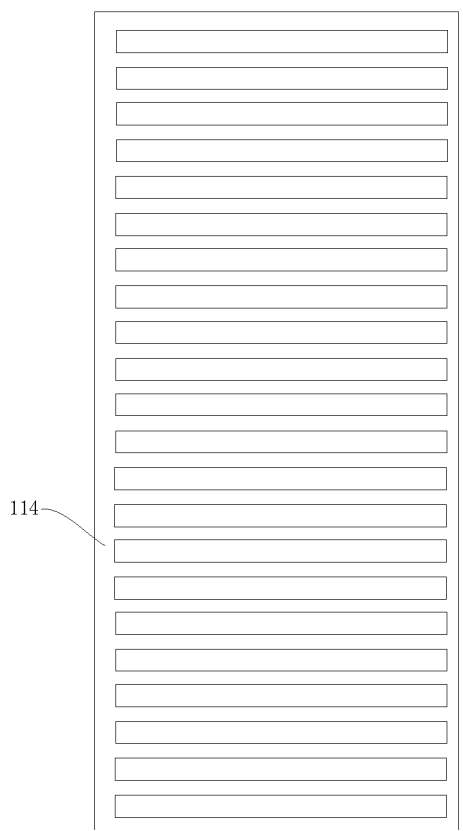
FIG. 9 is a structural illustration of an array light sensor.

In some embodiments of the present disclosure, referring to FIG. 9, the image sensor may be an array light sensor. The array light sensor may be formed by a glass-based process.

The method for scanning imaging according to an embodiment of the present disclosure may be described as following. A scanning imaging part may be the above-mentioned scanning imaging part. For example, the scanning imaging part may include a transparent body, a light blocking ink, a charged liquid droplet, a microfluidic component, and a driving chip. The transparent body may include a first face and a second face opposite to each other. A closed liquid flow channel may be arranged along the first face. An image sensor may be arranged on the second face. The light blocking ink may be filled in the liquid flow channel and may be configured to block light on a side of the first face. The charged liquid droplet may be arranged in the liquid flow channel. The charged liquid droplet may be transparent and insoluble with the light blocking ink, and may be configured to transmit at least a part of light on one side of the first face through the light blocking ink. The microfluidic component may be arranged on the first face of the transparent body, and may be configured to drive the charged liquid droplet to move in the liquid flow channel. Thereby, light on the one side of the first face may be scanned via the charged liquid droplet to penetrate the light blocking ink, to form a scanning image by the image sensor. The driving chip may be communicatively connected to the microfluidic component and the image sensor.

The method for scanning imaging may include operations described as following.

The microfluidic component may control the charged liquid droplet to move in the liquid flow channel, so that light on one side of the first face may be scanned via the charged liquid droplet to the image sensor.

A plurality of external images may be scanned in different angles by the image sensor.

The plurality of external images in different angles may be subjected to an integral delay superposition, to form a target image.

In the method for scanning imaging according to an embodiment of the present disclosure, processes of scanning imaging by the above-mentioned scanning imaging part may be simplified, and an imaging effect of the scanning imaging part may be improved.

In some embodiments, the method for scanning imaging may include operations described as following.

An initial position of the charged liquid droplet may be set.

External image information may be transmitted to the image sensor via the charged liquid droplet.

A position of the charged liquid droplet may be changed, and external image information in different positions of the charged liquid droplet may be transmitted to the image sensor via the charged liquid droplet, and the image sensor may convert light of the image information into electrical information and may store it.

The image sensor may perform an integral delay superposition on external image information in any positions of the charged liquid droplet, to form a complete image.

In some embodiments of the present disclosure, as showing FIG. 6, the image sensor may perform an integral delay superposition on external image information in any positions of the charged liquid droplet, to form a complete image.

Referring to FIG. 4, the scanning imaging part 100 according to an embodiment of the present disclosure, may include a transparent body 110, a first flowing liquid column 230, second flowing liquid column 240, and microfluidic component 130. The scanning imaging part 100 may constitute a cover assembly of an electronic device. The transparent body 110 may be arranged stackedly on a display screen of an electronic apparatus 200 shown in FIGS. 1-3. The second flowing liquid column 240 may be a light block ink 120. It should be noted that the display assembly 220 may include the cover assembly.

The transparent body 110 may have the liquid flow channel 112 located inside the transparent body 110. The light 101 may be suitable for passing through the transparent body 110. The first flowing liquid column 230 and the second flowing liquid column 240 may be located in the liquid flow channel 112. The light 101 may be suitable for passing through the first flowing liquid column 230. The second flowing liquid column 240 may be insoluble with the first flowing liquid column 230. Because the first flowing liquid column 230 is insoluble with the second flowing liquid column 240, the second flowing liquid column 240 may be divided into two portions when the first flowing liquid column 230 is moving.

The microfluidic component 130 may be arranged on a face of the transparent body 110. The microfluidic component 130 may be communicatively connected to the first flowing liquid column 230, to control the first flowing liquid column 230 to move. The microfluidic component 130 may drive the first flowing liquid column 230 to operate by an electromagnetic field induction, an N-S magnetic field or the like. The "communicatively connected" herein may be understood as a certain connection or linkage relationship between two components by an electrical signal, an electromagnetic signal, an electric field, or an electric field force.

It should be noted that, a structure may be formed on transparent body 110 to realize pinhole imaging (or called micro slit imaging) by a property in light transmission of the first flowing liquid column 230. For example, referring to FIG. 5, when light 101 on one side of the first flowing liquid column 230 is irradiated to the first flowing liquid column 230, a part of the light 101 may enter into the transparent body 110 via the first flowing liquid column 230. The part of the light 101 may be acquired by the light sensor located on the other side of the first flowing liquid column 230, to realize acquiring image information.

When the microfluidic component 130 controls to change a position of the first flowing liquid column 230 for imaging by the first flowing liquid column 230, scanning imaging in different directions may be realized. The light sensor of the electronic apparatus 200 may perform an integral delay superposition on images acquiring by the micro slit imaging, to form a complete image. It should be noted that, the integral delay superposition is a technology as shown in FIG. 6. Different images acquired may be misaligned and superposed to form a complete image.

In the electronic apparatus and cover assembly according to an embodiment of the present disclosure, the first flowing liquid column 230 and the second flowing liquid column 240 which are insoluble with each other, may be arranged in the liquid flow channel 112, to form a structure which may realize pinhole imaging (or called micro slit imaging) by a property in light transmission of the first flowing liquid column 230, so that image information may be acquired by the principle of pinhole imaging. Further, the first flowing liquid column 230 may be set as a movable component, so that more information of light 101 may be acquired, and thus a more complete picture effect may be presented.

In some embodiments of the present disclosure, the liquid flow channel 112 may be formed in a groove structure inside the cover by a grooving process. In some embodiments of the present disclosure, referring to FIG. 4 and FIG. 11, the liquid flow channel 112 may extend in a curved shape. Thereby, the first flowing liquid column 230 may move along the liquid flow channel 112, to increase a view angle for scanning, so that the light sensor of the electronic apparatus 200 may acquire images in different view angles.

In order to conveniently control the first flowing liquid column 230 to move, the microfluidic component 130 may be a microfluidic membrane. The microfluidic membrane may be bonded to one side of the transparent body 110. It should be noted that, the microfluidic membrane may have a structure as shown in FIG. 7, and the microfluidic electric field may have a distribution as shown in FIG. 8. The microfluidic membrane may include two layers of transparent conductive indium tin oxide (ITO) film and a transparent insulating PVX (silicon nitride) between two the conductive ITO films. A voltage may be increased between a conductive ITO film in a vertical direction and a conductive ITO film in a lateral direction. A strong electric field that may penetrate the transparent body 110 may be generated between the two conductive ITO films, to control the first flowing liquid column 230 (the first flowing liquid column 230 may move in a direction of an electric field line). Thereby, a position of the first flowing liquid column 230 may be controlled by an electrical signal.

Further, the first flowing liquid column 230 may be the charged liquid droplet 121. The microfluidic membrane may be a microfluidic thin membrane. The microfluidic membrane may have a structure as shown in FIG. 7, and the microfluidic electric field may have a distribution as shown in FIG. 8. The microfluidic membrane may include a transparent insulating PVX (silicon nitride) film and two layers of crossed transparent conductive indium tin oxide (ITO) film. The transparent insulating PVX (silicon nitride) film may be located between the two layers of ITO film. Referring to FIG. 7, the ITO wirings 131 in a vertical direction may form a transparent conductive ITO film, and The ITO wirings 131 in a lateral direction may form a transparent conductive ITO film. The transparent insulating PVX (silicon nitride) may be arranged between the two transparent conductive ITO films.

The transparent body may be a transparent glass. A voltage may be increased between the ITO wirings 131 in the vertical direction and the ITO wirings 131 in the lateral direction. A strong electric field that may penetrate the glass may be generated between the two conductive ITO films, to control the charged liquid droplet 121 (the charged liquid droplet 121 may move in a direction of an electric field line). Thereby, a position of the charged liquid droplet 121 may be controlled by an electrical signal.

In some embodiments of the present disclosure, referring to FIGS. 4 to 5, the cover assembly may further include a light sensor. The light sensor may be located on the other face of the transparent body 110. Thereby, the light may pass through the first flowing liquid column 230 from the one face of the transparent body 110, and may irradiate the light sensor located on the other face of the transparent body 110, so that image information acquired by the light sensor may be presented. It should be noted that, the light sensor may be one of the image sensors 114.

Further, referring to FIG. 9, the light sensor may be an array light sensor. The array light sensor may be bonded to the other face of the transparent body 110. Referring to FIG. 9, the array light sensor may be configured to receive pinhole imaging, and may convert light information into electronic information. Further, the light sensor may be a strip shape or a narrow strip shape, so that a photosensitive area may be increased. A color film may be added to identify color information.

In some embodiments of the present disclosure, the second flowing liquid column 240 may be oily ink. The oily ink may be hard to be soluble with other materials, and may have good fluidity. Thereby, the oily ink may be suitable for the first flowing liquid column 230 flowing in the second flowing liquid column 240.

In some embodiments of the present disclosure, referring to FIG. 4, a part of edge of the transparent body 110 may be a curved face. The liquid flow channel 112 may be located on the curved face, to save space of the transparent body 110. Thereby, screen ratio may be increased, and a full screen may be easily realized. For example, referring to FIG. 4, the liquid flow channel 112 may be located on an upper edge of the transparent body 110. Alternatively, the liquid flow channel 112 may be located on left and right edges of the transparent body 110.

For example, referring to FIG. 4, a cross section of the transparent body 110 may be a sector shape. The array light sensor may be bonded to one face closed to a center of the sector shape. The liquid flow channel 112 may be located on one face away from the center of the sector shape. Thereby, properties of the sector shape may be suitable for optimization in an arrangement of the liquid flow channel 112 and the light sensor.

In some embodiments of the present disclosure, referring to FIG. 10, number of the liquid flow channel 112 may be plural, and number of the first flowing liquid column 230 and number of the second flowing liquid column 240 may also be plural. The liquid flow channel 112, the first flowing liquid column 230, and the second flowing liquid column 240, so that more image information may be acquired by the micro slit imaging.

Figure 2:
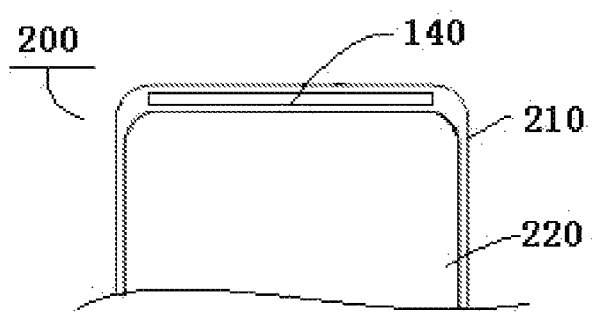
FIG. 2 is a partial structural illustration of an electronic apparatus in accordance with an embodiment in the present disclosure.
Figure 3:
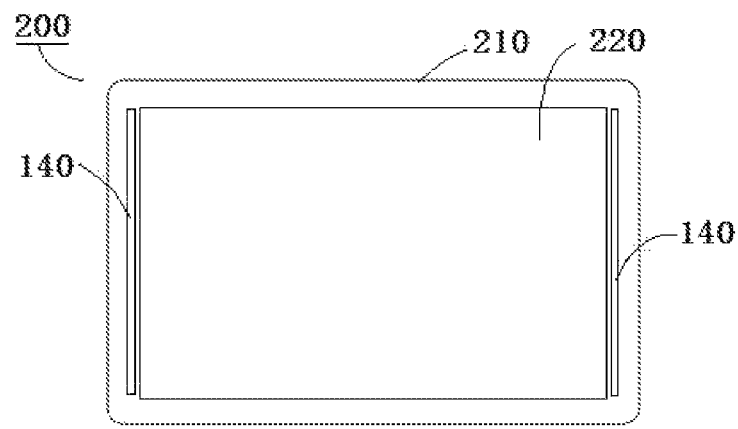
FIG. 3 is a structural illustration of an electronic apparatus in accordance with an embodiment in the present disclosure.

Referring to FIGS. 1 to 3, the electronic apparatus 200 according to an embodiment of the present disclosure may include a housing 210, a display assembly 220, and the above-mentioned scanning imaging device 140. The display assembly 220 may be mounted on the housing 210. The scanning imaging device 140 may be the above-mentioned scanning imaging device 140. The scanning imaging device 140 may be arranged along any side of the display screen assembly 220. A light incident face of the scanning imaging device 140 may be smoothly connected to a display face of the display screen assembly 220. For example, the light incident face of the scanning imaging device 140 may be tangent to the outside surface of the display screen assembly 220.

It should be understood that "electronic apparatus" in the present disclosure may include, but be not limited to an apparatus receiving/transmitting communication signals via wired connection, for example, public switched telephone network (PSTN), digital subscriber line (DSL), digital cable, electric cable and/or another data connection/network, and/or cellular network, Wireless Area Networks (WLAN), digital television network such as DVB-H (Digital Video Broadcasting Handheld) network, satellite network, AM-FM broadcast transmitter and/or another communication terminal of wireless interface. The electronic apparatus may also include a satellite or cellular telephone, a personal communication system terminal with cellular radio telephone and data processing, facsimile and data communication, beeper, or other electronic apparatuses with a transceiver.

In some embodiments of the present disclosure, the electronic apparatus 200 may be various devices capable of acquiring data from outside and processing the data, or the electronic device 200 may be various devices that have a built-in battery and are capable of taking current from the outside to charge the battery. For example, a mobile phone, a tablet, a computing device, or an information display device.

In the electronic apparatus 200 according to an embodiment of the present disclosure, a structure which may realize pinhole imaging (or called micro slit imaging) may be formed on the transparent body 110, so that image information may be acquired by the principle of pinhole imaging.

In some embodiments of the present disclosure, micro slit imaging technology may be understood as a scanning type camera solution. The solution may be realized by a specific glass shape, matching microfluidic technology, and subjecting images to an integral delay superposition technology. A sector glass may be processed grooves inside and filled with oily ink and charged liquid droplet 121. A thin film with a microfluidic circuit may be located on an outer curved face of the sector glass, and may be configured to control a position of the charged liquid droplet 121. An array light sensor may be located on an inner plane face of the sector glass, and may be configured to image. A micro slit structure may be formed at a position that light may pass through the charged liquid droplet 121. An external image may be imaged on the light sensor through the micro slit structure. The microfluidic circuit may control the position of the charged liquid droplet 121 to change, and the micro slit structure may also change, so that scanning and imaging processes may be processed. Finally, the scanned images may be integrated into a complete image by the integral delay superposition technology. Different from the silicon-based array type conventional camera, the camera may be a thin strip-shaped scanning type, and may have a large light sensor area. It may be convenient for integration on edges or sides of the mobile electronic apparatus 200, and may have good dark state and static shooting effect.

In some embodiments, base units of the scanning type camera may be labeled as shown in FIG. 4. The base units of the scanning type camera may be composed of a transparent glass, an array light sensor, oily ink, a charged liquid droplet 121, and a thin film with a microfluidic circuit. One face of the transparent glass may be curved, and the other five faces may be plane. The transparent glass may be hollowed inside and filled with oily ink and charged liquid droplet 121. The transparent thin film with the microfluidic circuit may be located on the curved face. The array light sensor may be located on the plane face opposite to the curved face.

Working principle of the base units may have operations described as following.

A) The thin film with the microfluidic circuit may control positions of the charged liquid droplet 121.

B) An external image may be imaged on the array light sensor through the micro slit structure formed by the charged liquid droplet 121. A light path of the micro slit imaging is shown as FIG. 4.

C) The array light sensor may convert light of the image information into electrical information and may store it.

D) The thin film with the microfluidic circuit may control the position change of the charged liquid droplet 121. The operations of A, B, and C may be and repeated, to realize scanning imaging in different directions.

E) Each scanned image may be integrated into a complete image by the integral delay superposition. The integral delay superposition technology is shown in FIG. 5. Different images acquired may be misaligned and superposed to form a complete image.

The microfluidic membrane may have a structure as shown in FIG. 7, and the microfluidic electric field may have a distribution as shown in FIG. 8. The microfluidic membrane may include two layers of transparent conductive indium tin oxide (ITO) film and a transparent insulating PVX (silicon nitride) between two the conductive ITO films. A voltage may be increased between a conductive ITO film in a vertical direction and a conductive ITO film in a lateral direction. A strong electric field that may penetrate the glass may be generated between the two conductive ITO films, to control the charged liquid droplet 121 (the first flowing liquid column 230 may move in a direction of an electric field line). Thereby, a position of the micro slit may be controlled by an electrical signal.

The array light sensor is shown in FIG. 9. The array light sensor may be configured to receive the micro slit imaging and convert a light signal into an electrical signal. The light sensor may be a strip shape or a narrow strip shape, so that a photosensitive area may be increased. A color film may be added to identify color information. A two dimensional imaging scanning type camera body may be obtained by combining several basic units of the scanning type camera. The two dimensional imaging scanning type camera may be a thin strip shape as shown in FIG. 10.

Selections of materials and processes in some embodiments may be described as following (but not specifically limited).

a) When a channel is processed, a cover may be made of a glass cover, and hydrofluoric acid may be select to glass grooving.

b) The opaque oily ink and the transparent charged liquid droplet 121 may be sealed in the channel. When the channel is sealed, a frame sealing material or a glass bonding process may be selected.

c) The ink is may be insulating oily ink, to avoid dispersion of liquid droplets or electron transfer form liquid droplets.

d) When density of the array light sensor is not high, it may be realized by a glass-based process. When the density of the array light sensor is high, a silicon-based process may be required. The manufactured array light sensor may be bonded to a glass face.

e) When the array light sensor image acquires and the microfluidic component controls the position of the transparent charged liquid droplet 121, new development of a driver integrated circuit support may be required and certain synchronization timings may be followed.

Referring to FIG. 3, for the electronic apparatus 200 with gesture recognition requirements, two thin strip-shaped scanning type cameras may be used to complete the gesture recognition. It may have an advantage of large viewing angle. It may avoid a problem that when using a front camera to recognize a gesture on the face of the far-end screen, the recognized gesture is distortion. It may also avoid a problem that a fisheye camera protrudes a cover face.

Referring to FIG. 1, according to requirements of a full screen of mobile phone products, the thin strip-shaped scanning type camera may be arranged at a edge of the mobile phone as a front camera (the front camera is usually not configured to take motion pictures, it is more suitable for scanning type camera and the integral delay superposition technology). A viewing angle of the scanning type camera may be achieved by improving a direction of the sector glass.

The gesture recognition method, according to an embodiment of the present disclosure, and applied to the above-mentioned electronic apparatus 200, may include operations described as following.

A plurality of gesture images in different angles during a gesture operation, may be acquired, by the scanning imaging device.

The plurality of gesture images in different angles may be subjected to an integral delay superposition, to form a target gesture image.

An operation instruction corresponding to the gesture operation according to the target gesture image, may be determined, and the electronic apparatus may be triggered to respond to the operation instruction.

In the gesture recognition method, it may be conveniently operated, and volume of an electronic apparatus may be reduced by the scanning imaging device to determine gestures and the actions, so that a screen ratio of the scanning imaging device may be reduced, and a full screen of the electronic apparatus may be easily realized.

In the description of the present disclosure, reference to the terms "one embodiment", "some embodiments", "illustrative embodiment", "example", "specific example", or "some examples" and the like is intended to mean that specific features, structures, materials, or characteristics described in the embodiment or example are included in at least one embodiment or example of the present disclosure. In the present disclosure, the schematic representation of the above terms does not necessarily mean the same embodiment or example. Furthermore, the particular features, structures, materials, or characteristics described may be combined in a suitable manner in any one or more embodiments or examples.

While the embodiments of the present disclosure have been shown and described, it will be understood by those skilled in the art that the scope of the present disclosure is defined by the claims and their equivalents.

What is claimed is:

1. A scanning imaging part, comprising:
a transparent body comprising a first face and a second face opposite to each other, wherein a closed liquid flow channel is defined in the transparent body adjacent to the first face, and an image sensor is arranged on the second face;
a light blocking ink filled in the liquid flow channel and configured to block light incident from the first face;
a charged liquid droplet arranged in the liquid flow channel, wherein the charged liquid droplet is transparent and insoluble with the light blocking ink, and is configured to transmit at least a part of the light incident from the first face through the charged liquid droplet and to the image sensor; and
a microfluidic component arranged on the first face of the transparent body, and configured to drive the charged liquid droplet to move in the liquid flow channel, so that light incident from the first face is scanned via the charged liquid droplet and forms a scanning image by the image sensor.

2. The scanning imaging part according to claim 1, wherein
the transparent body is a plate body in a trapezoidal shape;
a side face on the plate body corresponding to a lower base of the trapezoidal shape is a curved face, and a side face on the plate body corresponding to an upper base of the trapezoidal shape is a plane; and
the lower base face is the first face, and the upper base face is the second face.

3. The scanning imaging part according to claim 1, wherein
the transparent body is a sector plate body; and
an outer side face of the sector plate body is the first face, and an inner side face of the sector plate body is the second face.

4. The scanning imaging part according to claim 1, wherein
the first face is a curved face;
the liquid flow channel extends along a curved path corresponding to the first face and is covered by the first face; and
a photosensitive face of the image sensor is arranged toward the second face.

5. The scanning imaging part according to claim 4, wherein
a distance between a center of the liquid flow channel along the curved path corresponding to the first face, and the first face, is constant.

6. The scanning imaging part according to claim 4, wherein
the image sensor is a strip shape, and is configured to receive light transmitted by the charged liquid droplet at any location in the liquid flow channel.

7. The scanning imaging part according to claim 4, wherein
a projection of the liquid flow channel on the second face is at least partially overlapped with a projection of the image sensor on the second face.

8. The scanning imaging part according to claim 1, wherein
a diameter of the charged liquid droplet is greater than or equal to an inner diameter of the liquid flow channel.

9. The scanning imaging part according to claim 1, wherein
the microfluidic component is bonded to the first face.

10. The scanning imaging part according to claim 1, wherein
a projection of the liquid flow channel on the first face is at least partially overlapped with a projection of the microfluidic component on the first face.

11. The scanning imaging part according to claim 1, wherein
the microfluidic component comprises:
a first transparent conductive film;
a second transparent conductive film; and
a transparent insulating film;
the first transparent conductive film is bonded to the first face; and
the second transparent conductive film is bonded to the first transparent conductive film by the transparent insulating film.

12. The scanning imaging part according to claim 11, wherein
the first transparent conductive film comprises a plurality of indium tin oxide wirings extending along a first direction;
the second transparent conductive film comprises a plurality of indium tin oxide wirings extending along a second direction; and
the plurality of indium tin oxide wirings extending along the first direction and the plurality of indium tin oxide wirings extending along the second direction are arranged across to each other, and are insulated from each other.

13. The scanning imaging part according to claim 1, wherein
the charged liquid droplet is in close contact with an inner wall face of the liquid flow channel.

14. A scanning imaging device, comprising:
at least one scanning imaging part, wherein each scanning imaging part comprises:
a transparent body comprising a first face and a second face opposite to each other, wherein a closed liquid flow channel is defined in the transparent body adjacent to the first face, and an image sensor is arranged on the second face;
a light blocking ink filled in the liquid flow channel and configured to block light incident from the first face;
a charged liquid droplet arranged in the liquid flow channel, wherein the charged liquid droplet is transparent and insoluble with the light blocking ink, and is configured to transmit at least a part of the light incident from the first face through the charged liquid droplet and to the image sensor; and
a microfluidic component arranged on the first face of the transparent body, and configured to drive the charged liquid droplet to move in the liquid flow channel, so that light incident from the first face is scanned via the charged liquid droplet and forms a scanning image by the image sensor.

15. The scanning imaging device according to claim 14, wherein
the number of the scanning imaging parts is plural;
a plurality of the scanning imaging parts are arranged side by side along a third direction; and
the liquid flow channel extends along a fourth direction, and the third direction is perpendicular to the fourth direction.

16. The scanning imaging device according to claim 15, wherein
the plurality of the scanning imaging parts shares the same image sensor.

17. The scanning imaging device according to claim 15, wherein
a light blocking layer is arranged between any two adjacent scanning imaging parts.

18. The scanning imaging device according to claim 15, further comprising a driving chip, wherein the driving chip is communicatively connected to the microfluidic component and the image sensor.

19. An electronic apparatus, comprising:
a housing;
a display screen assembly mounted on the housing; and
a scanning imaging device comprising at least one scanning imaging part, wherein each scanning imaging part comprises:
a transparent body comprising a first face and a second face opposite to each other, wherein a closed liquid flow channel is defined in the transparent body adjacent to the first face, and an image sensor is arranged on the second face;
a light blocking ink filled in the liquid flow channel and configured to block light incident from the first face;
a charged liquid droplet arranged in the liquid flow channel, wherein the charged liquid droplet is transparent and insoluble with the light blocking ink, and is configured to transmit at least a part of the light incident from the first face through the charged liquid droplet and to the image sensor; and
a microfluidic component arranged on the first face of the transparent body, and configured to drive the charged liquid droplet to move in the liquid flow channel, so that light incident from the first face is scanned via the charged liquid droplet and forms a scanning image by the image sensor;
wherein
the scanning imaging device is arranged along any side of the display screen assembly; and
a light incident face of the scanning imaging device is smoothly connected to a display face of the display screen assembly.

20. The electronic apparatus according to claim 19, wherein the light incident face of the scanning imaging device is tangent to the display face of the display screen assembly.

* * * * *